(12) United States Patent
Weldon

(10) Patent No.: US 9,879,457 B1
(45) Date of Patent: Jan. 30, 2018

(54) TROLLEY AND TRACK

(71) Applicant: Weldon Industries, Inc., Tampa, FL (US)

(72) Inventor: Mark Weldon, Tampa, FL (US)

(73) Assignee: Weldon Industries, Inc., Tampa, FL (US)

( * ) Notice: Subject to any disclaimer, the term of this patent is extended or adjusted under 35 U.S.C. 154(b) by 412 days.

(21) Appl. No.: 14/614,949

(22) Filed: Feb. 5, 2015

(51) Int. Cl.
*E05D 15/06* (2006.01)
*B61B 10/02* (2006.01)

(52) U.S. Cl.
CPC ........ *E05D 15/0617* (2013.01); *B61B 10/025* (2013.01); *E05Y 2900/402* (2013.01)

(58) Field of Classification Search
CPC .................................................. E05D 15/0617
USPC ....................................................... 104/94, 106
See application file for complete search history.

(56) References Cited

U.S. PATENT DOCUMENTS

| | | | | |
|---|---|---|---|---|
| 3,076,418 A * | 2/1963 | Orwin | .................... | B65G 47/00 104/172.4 |
| 3,705,468 A | 12/1972 | Ashworth | | |
| 3,800,707 A * | 4/1974 | Hermann | ................ | H02G 5/04 104/300 |
| 4,058,064 A * | 11/1977 | Wilder | .................. | B61B 10/025 104/172.4 |
| 4,073,238 A * | 2/1978 | Knudsen | ................ | B61B 10/025 104/172.4 |
| 4,148,261 A * | 4/1979 | Wakabayashi | ........ | B61B 10/025 104/103 |
| 4,203,369 A * | 5/1980 | Perrott | .................... | E01B 25/26 104/103 |
| 4,640,196 A * | 2/1987 | Dehne | ..................... | E01B 25/10 104/109 |
| 4,944,230 A * | 7/1990 | Maeda | .................... | B61B 13/00 104/139 |
| 6,269,944 B1 * | 8/2001 | Taylor | ...................... | B66C 7/02 104/108 |
| 7,980,570 B2 | 7/2011 | Comunello | | |
| 8,196,353 B2 | 6/2012 | Loidcit | | |
| 2008/0035010 A1 * | 2/2008 | McKay | ..................... | B66C 7/04 104/94 |
| 2013/0269565 A1 * | 10/2013 | Darrow | ............... | A61G 7/1015 104/106 |

FOREIGN PATENT DOCUMENTS

EP      1770235 A1    4/2007

* cited by examiner

Primary Examiner — Zachary L Kuhfuss
(74) Attorney, Agent, or Firm — Christopher Paradies; Paradies Law P.A.

(57) ABSTRACT

A trolley assembly comprises a frame incorporating at least one tire encompassing a wheel bearing and a bumper comprising a first portion made of a comparably incompressible material and a second portion made of a comparably compressible material. The bumper is mounted on the frame such that the bumper moves upon impact with an object, compressing the compressible material. For example, the incompressible material may be a polyamide and the compressible material may be a neoprene extrusion.

12 Claims, 12 Drawing Sheets

FIG. 10
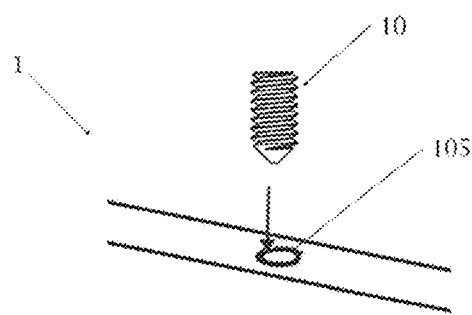
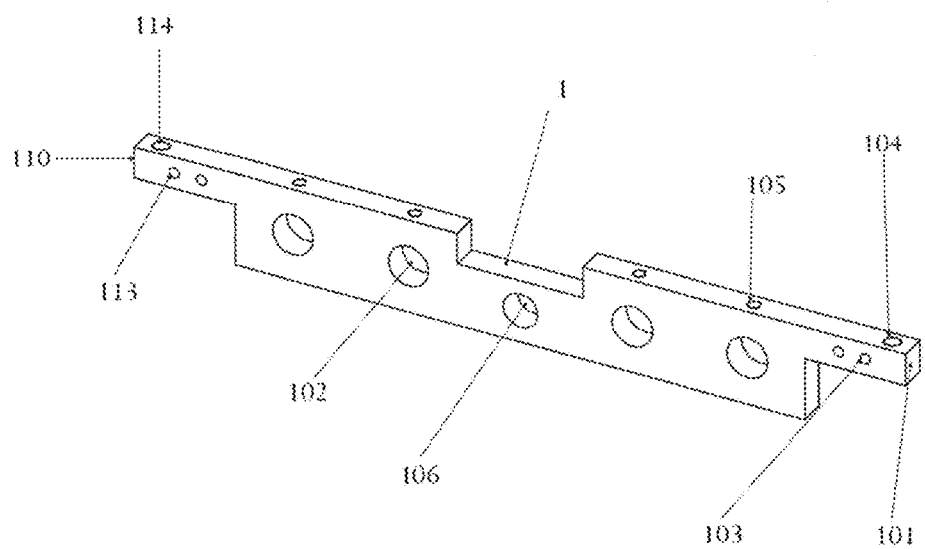
FIG. 3

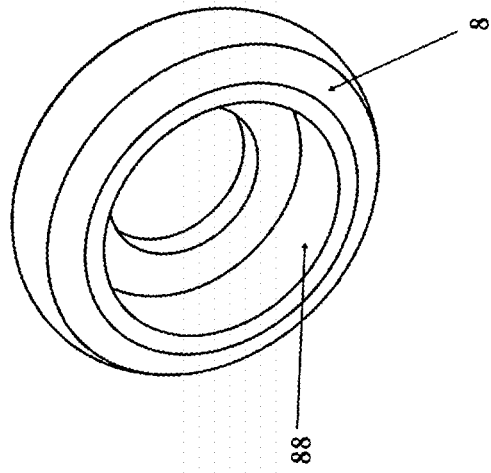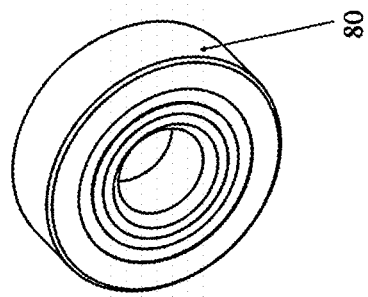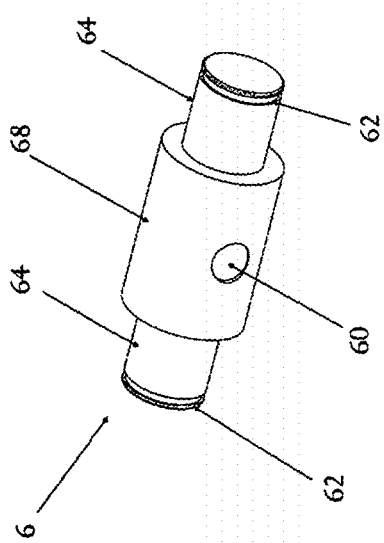

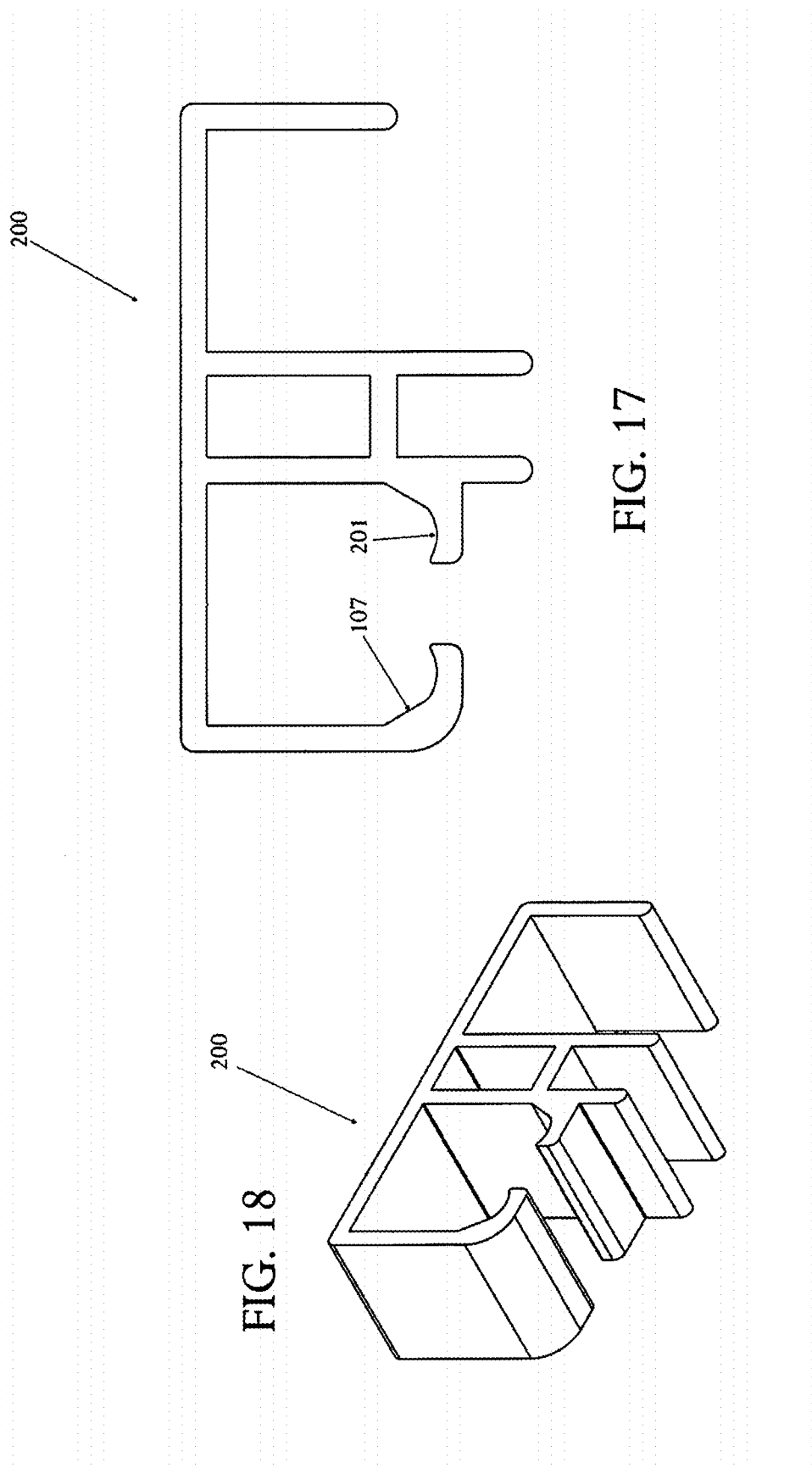

TROLLEY AND TRACK

FIELD OF THE INVENTION

The field relates to gates using a wheeled trolley riding in a track.

BACKGROUND

Trolley assemblies are known that use steel tracks and other steel components for sliding, cantilever gates; however, all of the known assemblies are noisy and having significant issues with wear. U.S. Pat. No. 7,980,570 discloses a trolley and channel with typical steel wheels and a simple metal channel. European publication, EP1770235 A1, was filed and received application number EP20050021280 on Sep. 29, 2005, with a priority date of Sep. 29, 2005. U.S. Pat. No. 8,196,353 B2, uses two opposing and offset wheels, engaging opposing rails of the track. U.S. Pat. No. 3,705,468 discloses a cantilevered gate with a trolley assembly. U.S. Pat. No. 3,705,468 has tapered wheels and a tapered channel. These cantilevered gates are known and various improvements have been made in each of the patents. None of these references provide for quiet operation of a cantilevered gate and some use much more complicated systems attempting to correct for other perceived problems with cantilevered gates. Centering wheels at opposite ends of the trolley assemblies use standard wheel bearings. The wheels are usually standard wheel bearings, also.

SUMMARY

A trolley comprises a frame and a bumper extending from one side of the frame. The frame is comprised of a rigid member. The rigid member has a first end and a second end, the first end extending in a first direction and the second end extending in a second direction, opposite of the first direction. At the first end of the rigid member, the bumper is mounted. The bumper is resilient, meaning that it is capable of absorbing the energy of an impact between the frame and an object and is substantially restored to its previous condition after the impact.

The trolley and track substantially reduces clatter and noise of gate operation compared to known systems. Especially, when a gate reaches its maximum open or closed position and the end of the trolley impacts a stop, conventional systems generate a sharp report, and efforts to reduce the noise tend to work for only a limited time before weathering and wear substantially reduce the effectiveness.

For example, a resilient bumper may comprise a compressible portion and an incompressible portion. Herein, compressible and incompressible are utilized and defined as would be understood by a person having ordinary skill in the art, when informed by this application. "Compressible" means comparatively compressible, such as a foam or elastic material that is capable of being compressed, absorbing energy of an impact and providing a bias force in a direction opposite to the force of the impact expected during use of the trolley. For example, a neoprene portion may be used as a material for the compressible portion. "Incompressible" means comparatively incompressible, when compared to the compressible materials, such as a plastic or other comparatively rigid material, which is capable of substantially maintaining its shape during the impacts expected during use of the trolley. For example, the incompressible portion may have a contact surface at an end of the incompressible portion facing in the first direction, and it is the contact surface that makes the initial contact with the object or stop. The material for the incompressible portion may be a nylon or polyamide, for example.

For example, the incompressible portion of the resilient bumper may be mounted slidably on the first end of the frame such that the contact surface of the incompressible portion extends outwardly from the first end of the frame in the first direction. The compressible portion may be disposed between the incompressible portion and a portion of the frame. The frame may be a substantially rigid member, such that, when the contact surface of the incompressible portion impacts an object, the compressible portion of the bumper is squeezed between the incompressible portion of the bumper and the frame. Upon impact, the incompressible portion slides toward the frame, and the compressible portion compresses between the incompressible portion and the portion of the frame. The compressible portion absorbs energy of the impact and applies a bias force against movement of the incompressible portion toward the frame, in the second direction. The bias force increases as the compressible portion is compressed until the bias force is sufficient to stop the trolley. The distance that the trolley travels during compression is greater than would be the case, if the bumper were made of only the comparatively incompressible portion. After each impact, the biasing force of the elastic, compressible portion substantially restores the incompressible portion back to its original position relative to the frame, for example.

In one example, a trolley further comprises at least one wheel comprised of a resilient, non-metallic tire. "Resilient" means a material that substantially maintains its shape while absorbing more energy than a rigid, steel wheel. For example, a polymer, such as a nylon, may be used for a resilient, yet comparatively incompressible material for both the tire and the incompressible portion of the bumper. The tire may be fit on a wheel bearing mounted on a support wheel shaft or axle, extending through the frame, for example.

In one example, a pair of wheels are disposed on opposite sides of the rigid member of the frame using a common support wheel shaft. Opposite ends of the support wheel shaft extend from opposite sides of the rigid member of the frame, providing a pair of axles for a pair of wheels on opposite sides of the frame. Herein, rigid means substantially stiff during normal operations.

The hub of a wheel may engage an axle. In one example, a set screw extending through the frame fixes the support wheel shaft within the frame. A plurality of paired wheels may be used to support the weight of a gate, such as two pairs, four pairs or more. Alternatively, wheel bearings capable of supporting a greater weight per wheel bearing may be specified and fewer pairs of wheels may be used to support the same weight of a gate.

In one example, a wheel bearing has an outer radial surface rotatably mounted on a hub, and a tire, such as a resilient tire, engages the outer radial surface of the wheel bearing, such that the tire and outer radial surface of the wheel bearing rotate about the hub together, without slippage of the tire on the wheel bearing. Compared to a metal wheel bearing having a metal outer radial surface, the tire can be comparatively resilient, reducing operating noise of the trolley, while not substantially increasing friction of the wheel as it rolls along a track.

In one example, the shape of the wheel is selected to have a convex portion or a convex contact surface, and a channel of the track is selected to have a concave portion or a concave contact surface, such that the convex portions fit into the concave portions. For example, the absolute value of the curvature of the convex portion may be greater than the absolute value of the curvature of the concave portion, such that contact is made only along a limited contact area between the tire and the channel contact surfaces. By providing a slope on an inside surface of the track, the tires of the trolley may be retained in region of the channel, such that no guide roller is required or a guide roller present on the trolley seldom impacts a side of the track. This helps to reduce chatter and noise during operation of the gate, also.

In one example, a trolley comprises a frame comprised of a rigid member, the rigid member having a first end and a second end, the first end extending in a first direction and the second end extending in a second direction, opposite of the first direction. A resilient bumper, comprises a compressible portion and an incompressible portion having a contact surface, and the incompressible portion of the resilient bumper is mounted slidably on the first end of the frame such that the contact surface of the incompressible portion extends outwardly from the first end of the frame in the first direction. The compressible portion is disposed between the incompressible portion and a portion of the frame, such that, when the contact surface of the incompressible portion impacts an object, the incompressible portion is capable of sliding in the second direction, and the compressible portion resiliently compresses between the incompressible portion and the portion of the frame, absorbing energy of the impact and applying a bias force against movement of the incompressible portion in the second direction.

For example, the trolley has at least one wheel, the wheel being comprised of a resilient, non-metallic tire, a wheel bearing and an axle. The wheel bearing has an outer radial surface rotatably mounted on a hub, and the hub of the wheel bearing is coupled by the axle at a side of the frame, such that the wheel is disposed between the first end of the frame and the second end of the frame. The tire engages the outer radial surface of the wheel bearing, such that the tire and outer radial surface of the wheel bearing rotate about the hub together, without slippage of the tire on the wheel bearing. In one example, a guide roller is coupled to the frame. The guide roller is attached under the bumper, such that the contact surface of the incompressible portion of the bumper extends beyond an outer circumference of the guide roller. In an alternative example, no guide roller is required, because a sloped portion of the track and a curved portion of the wheel recenter the trolley in the track without no need of a guide roller.

In one example, the bumper is coupled to the frame by at least one pin, the at least one pin engaging a slot formed in a portion of the incompressible portion of the bumper. For example, the at least one pin may be two pins, and the two pins each may extend through respective holes in the frame such that opposite ends of the two pins extend into respective slots formed in portions of the incompressible portion on opposite sides of the frame. The two pins and respective slots limit travel of the bumper in both the first direction and the opposite direction. In one example, portions of the incompressible portion on opposite sides of the frame engage a central portion of the compressible portion of the bumper, retaining the central portion of the compressible portion between the portions of the incompressible portion. Also, the compressible portion may have two legs extending from the central portion of the compressible portion, and the two legs may engage a central portion of the incompressible portion, such that the compressible portion is retainably engaged without any other retention device. This reduces wear by allowing the compressible portion to be compressed and uncompressed repeatedly without causing substantial wear to any portion of the compressible portion of the bumper, for example.

BRIEF DESCRIPTION OF THE DRAWINGS

The following drawings are illustrative examples and do not further limit any claims that may eventually issue.

FIG. 3 illustrates a detail view of a frame.

FIG. 6 illustrates a detail view of a support wheel shaft.

FIG. 7 illustrates a detail view of a wheel bearing.

FIG. 8 illustrates a detail view of a tire.

FIG. 10 illustrates a detail view of a set screw.

FIG. 17 illustrates a plan view of a track profile.

FIG. 18 illustrates a profile view of a short segment of a track.

When the same reference characters are used, these labels refer to similar parts in the examples illustrated in the drawings.

DETAILED DESCRIPTION

Figure 1:
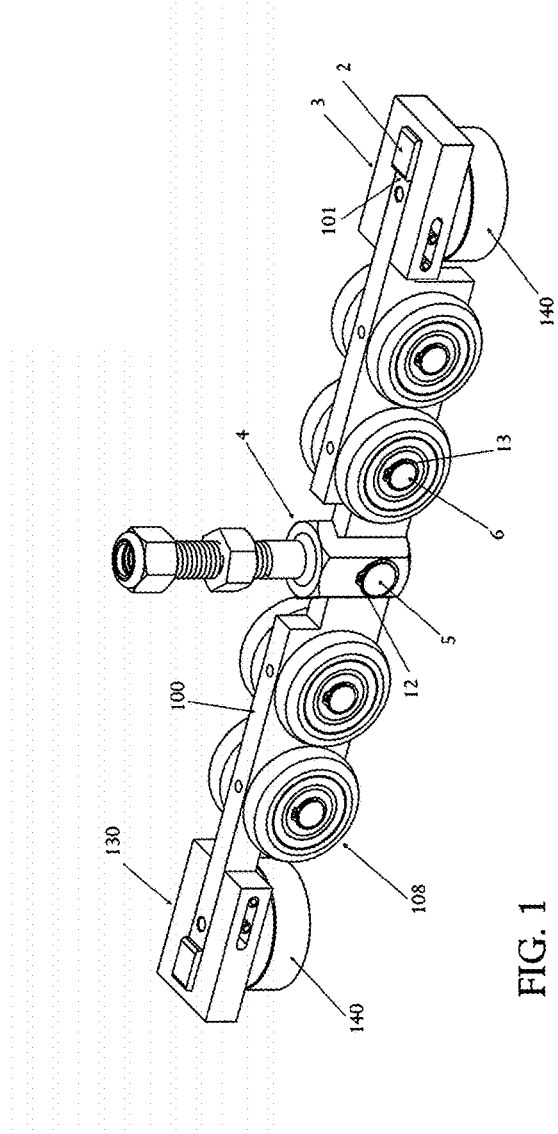
FIG. 1 illustrates an example of an 8-wheel trolley assembly.

A trolley and track provide substantially reduced chatter and noise compared to known trolleys and tracks during opening and closing of gates. In addition, wear and tear is reduced on components. In one example, a trolley assembly 100 comprises 2 wheels, 4 wheels or 8 wheels. For example, in FIGS. 1-3, a trolley assembly 100 has eight wheels 108 mounted in pairs along opposite sides of a frame 1. As best seen in FIG. 3, the frame 1 comprises a rigid member having holes 102, 103, 104, 105, 106 bored through the frame 1. Set screw holes 105 are tapped and threaded for accepting a set screw 10 as seen the in detail view of FIG. 10. A first end 101 and a second end 110 of the frame 1 extend beyond a wider portion of the rigid member, and both ends 101, 110 provide roll pin holes 103, 113 and guide roller screw holes 104, 114 for securing bumpers 130 and guide rollers 140 onto the frame 1. All holes represented in the drawings are through holes unless otherwise indicated. In one example, the guide rollers 140 are disposed in a notch formed by the wider portion of the rigid member and the ends 101, 110. Four of the holes 102 in the frame 1 are for inserting support wheel shafts 6, each having two opposite ends or axles 64, attached by a cylindrical body 68 for mounting a pair wheels 108 using a retaining rings 13 that engage grooves 62, for example. A through hole or blind hole 60 is provided for engaging with a set screw 10, fixedly securing the body 68 in the frame 1. The remaining hole 106 is for a clevis pin 5, which couples a clevis 4 to the frame 1 for attaching the trolley assembly 100 to a gate, for example.

Figure 2:
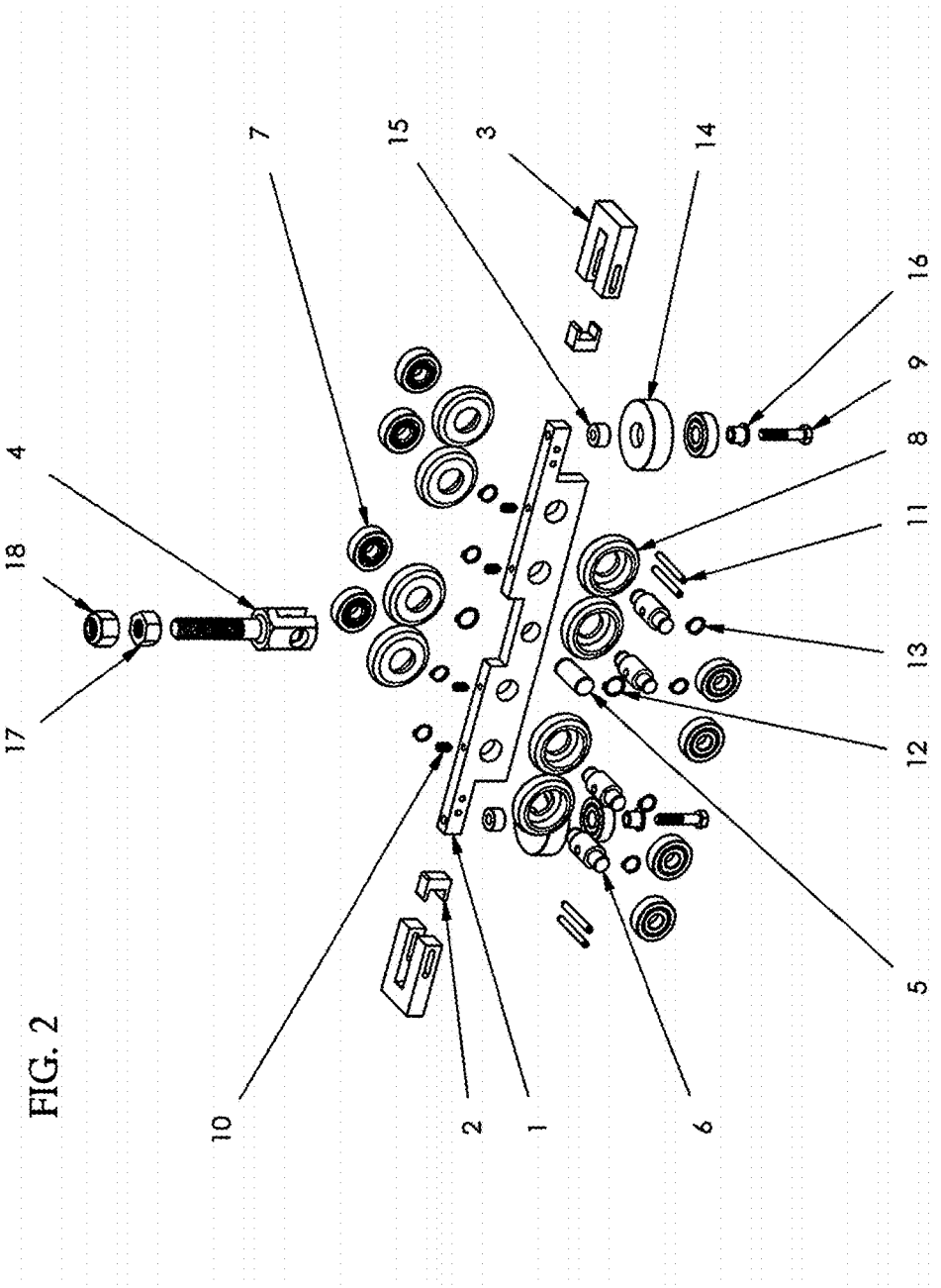
FIG. 2 illustrates an exploded view of the example of FIG. 1.
Figure 4:
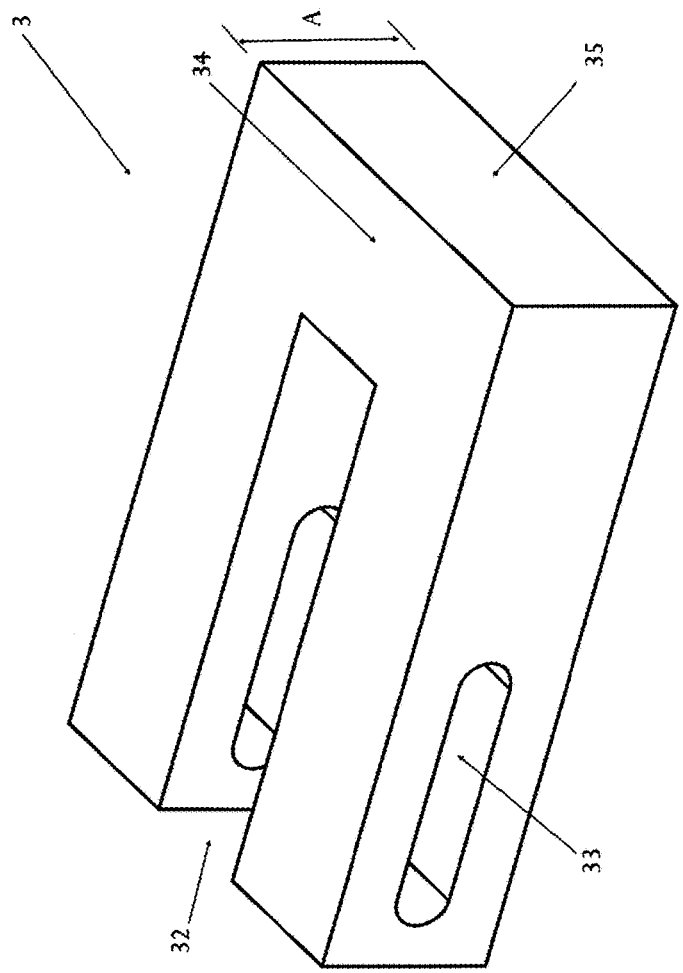
FIG. 4 illustrates a detail view of a first portion of a bumper.
Figure 5:
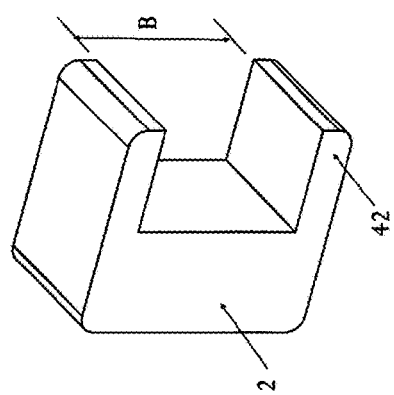
FIG. 5 illustrates a detail view of a second portion of a bumper.
Figure 9:
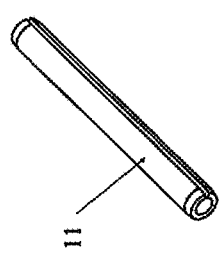
FIG. 9 illustrates a detail view of a roll pin.

Now referring to FIG. 2, an exploded view of the example in FIG. 1, the frame 1 is illustrated in relation to the remainder of the assembly. In this example, a comparatively compressible, biasing portion 2 of the bumper 130 is retained between each of the ends 101, 110 of the frame 1 and bumper blocks 3. Each of the bumper blocks 3 are retained on the frame 1 by a pair of roll pins 11, for example, which fit in slots 33 of the bumper blocks 3, as best illustrated in FIG. 4. In FIG. 4, a detail view of the biasing portion 2 is shown, which fits into the channel 32 formed by the u-shaped ends of the bumper blocks 3, illustrated in FIG. 3. The u-shaped members 42 of the biasing portion 2 have a dimension B larger than the thickness A of the base portion 34 of the bumper block 3, such that the members 42 of the biasing portion 2 extend on both sides of the base portion 34 of the bumper block 3, for example. Thus, each of the biasing portions 2 is retained between a respective one of the ends 101, 110 of the frame 1 and a bumper block 3, while allowing the bumper block 3 to move, whenever the contact surface 35 of the bumper block 3 impacts an object, such as a stop inserted to arrest the trolley assembly 100.

For example, the biasing portion 2 may be made of a comparatively compressible material, such as a foam material or an elastic material. In one example, the material selected for the biasing portion 2 is a neoprene extrusion. In contrast, the bumper block 3 is made of a comparably incompressible material, such as a harder plastic. In one example, the material selected for the bumper block 3 is a nylon or polyamide, a fiber reinforced polyamide or the like. For example, a carbon fiber reinforced polyamide 6/6 provides superb impact resistance, dimensional stability and wear resistance.

FIG. 6 illustrates a detail view of a wheel support shaft 6 having a body 68, which fits into one of the four holes 102 along the length of the frame 1, as illustrated in FIG. 3, for example. A set screw 10, as illustrated in FIG. 10, may be threadingly engaged within one of the four holes 105 in the frame 1, as illustrated in FIG. 3, and a blind bore hole 60 of the wheel support shaft detailed in FIG. 6, for example. The two axles extending from the body 68 of the shaft 6 each have a groove 62 for retaining a retaining ring, such as illustrated in FIG. 10, for example. The retaining ring 13 engages the groove 62 and retains each of the wheel bearings 7 on their respective axles 64, for example. A detail view of a wheel bearing 7 is illustrated in FIG. 7, showing contact surface 80, for example. For example, a wheel bearing may be comprised of a ball bearing providing rotation of the wheel with very low friction. This is a commercially available component.

An example of a tire 8 is illustrated in FIG. 8. The dimensions may be selected to provide a press fit onto a standard wheel bearing 7, for example, which prevents any slippage when the tire 8 is press fit onto the wheel bearing. The surface 88 engages the contact surface 80 of the wheel bearing 7, for example. The tire 8 may be made of a nylon or polyamide, for example. In one example, the tire may be made of the same material as the bumper block 3, for example.

Figure 12:
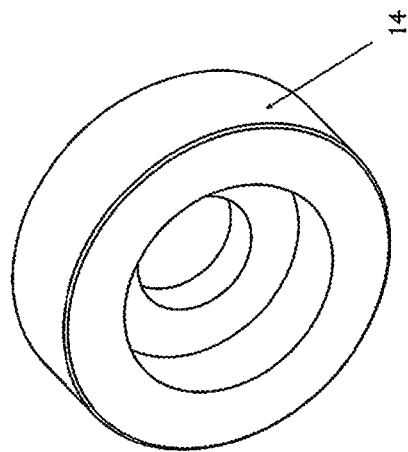
FIG. 12 illustrates a detail view of a guide roller.
Figure 13:
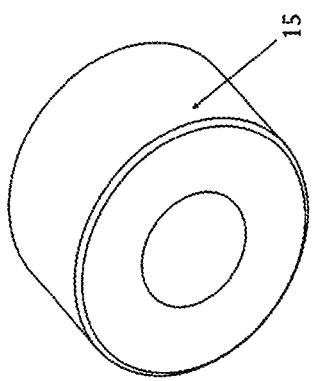
FIG. 13 illustrates a detail view of a guide roller sleeve.
Figure 14:
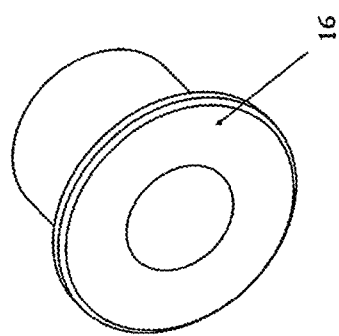
FIG. 14 illustrates a detail view of a guide roller bushing.

FIGS. 12, 13 and 14 illustrate detail views of components of a guide roller assembly 140, which may utilize a wheel bearing 7 in the assembly of the roller guide as illustrated in FIG. 2, for example. A guide roller 14 may be made of a zinc plated steel, for example, and is illustrated in the detail view of FIG. 12 and the exploded view of FIG. 2. A guide roller sleeve 15 is illustrated in detail in FIG. 13, fits within the guide roller 14 and may be made of the same material, for example. A guide roller busing 16, as illustrated in detail in FIG. 14, helps to retain a wheel bearing 7 within the guide roller assembly 140, for example, and may be made of zinc plated steel, also.

Figure 15:
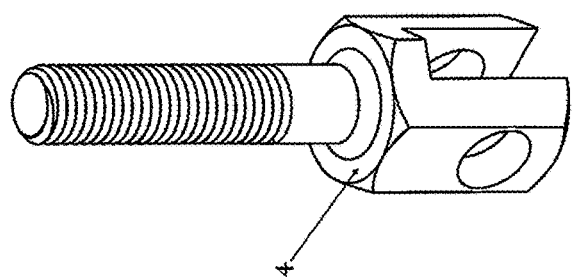
FIG. 15 illustrates a detail view of a clevis.
Figure 11:
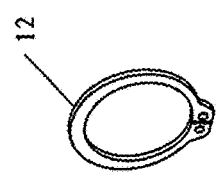
FIG. 11 illustrates a detail view of retaining ring.
Figure 16:
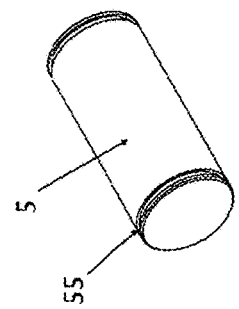
FIG. 16 illustrates a detail view of a clevis pin.

FIGS. 15 and 16 illustrate a clevis and clevis pin, which may be used to hang a gate from the trolley assembly. The clevis 4 and clevis pin 5 are shown assembled in FIG. 1 and in an exploded view in FIG. 2. Both may be made of a zinc plated steel, for example.

Figure 19:
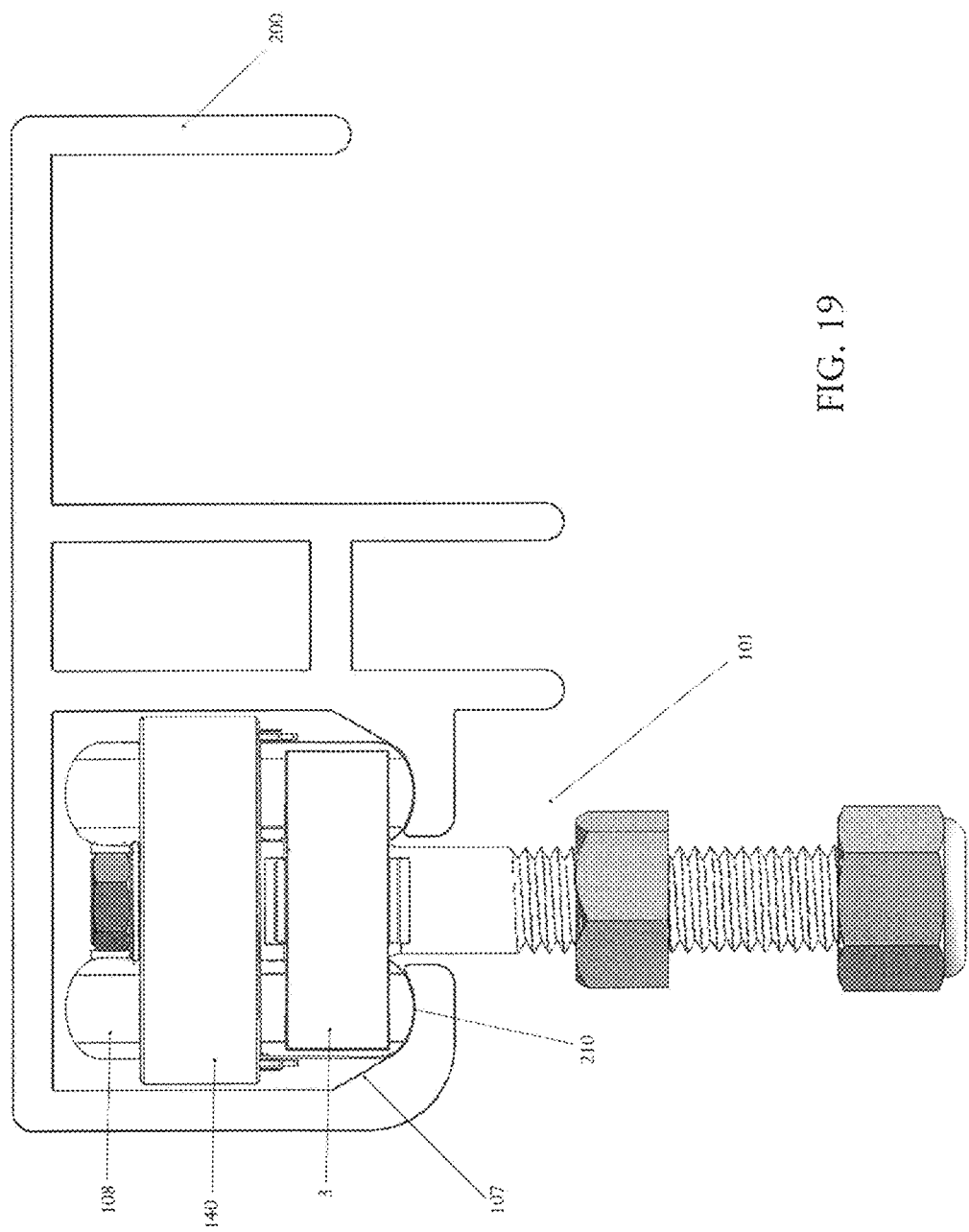
FIG. 19 illustrates a schematic view of an end a 4-wheel trolley engaging channels of a cross-section of a track.

FIGS. 17-19 illustrate a track 200 for use with the trolley assembly, for example. In FIG. 17 a cross-sectional representation shows two contact surfaces 201 as part of an extruded track. The track may be made of a metal, such as steel. In one example, the track is made of an extruded aluminum. In this particular example, there is no significant contact between any steel components and the aluminum extrusion. Instead, the tire 8, which may be a polymer, such as a polyamide, contacts the contact surfaces 201. FIG. 18 illustrates a perspective view of a short length of a track 200, which may extend for longer distances, depending on the span needed for opening and closing a gate, for example.

Figure 23:
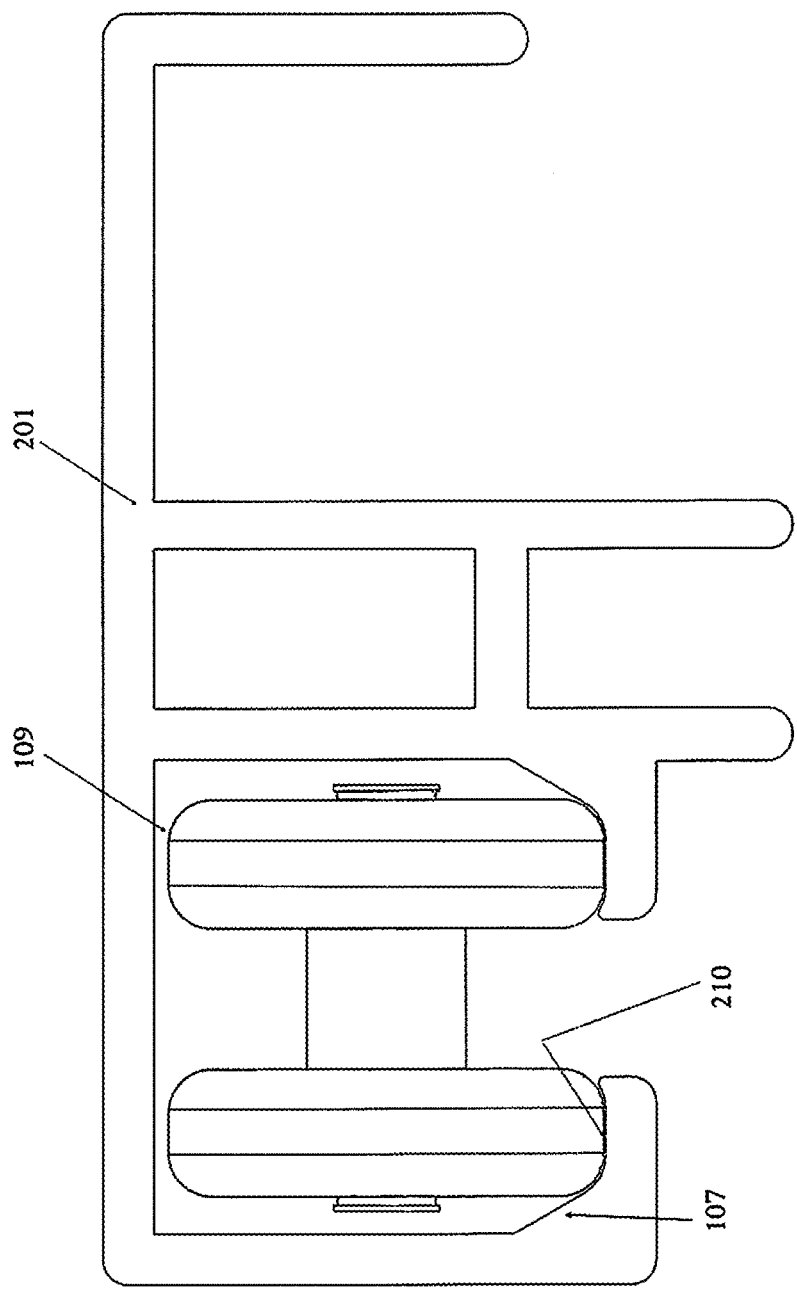
FIG. 23 illustrates another example of a track profile and a pair of wheels and a support wheel shaft of a trolley joining the two wheels.

FIG. 19 illustrates a schematic view of a trolley assembly 101 engaging the track 202, for example. The curvature of the wheels fits within the curvature of the track in this example. A sloped portion 107 of the track 200 keeps the wheels 108 centered in the trolley channel formed in the track 200, such that the contact surface of the wheels 108 ride on the contact surface 210 of the track 200. Alternatively, as illustrated in FIG. 23, the contact 210 between the wheel and the channel may be planar, and the curved surface of the wheel may have a curvature greater than that of the curvature of the curved portion of the track. Nevertheless, the sloped portion 107 of the tracks 200, 201 will still function to keep the trolley centered in the channels formed in the tracks 200, 201, reducing or eliminating any impacts of the guide rollers 140, if guide rollers are even present, on the side walls of the track 200, 201.

Figure 20:
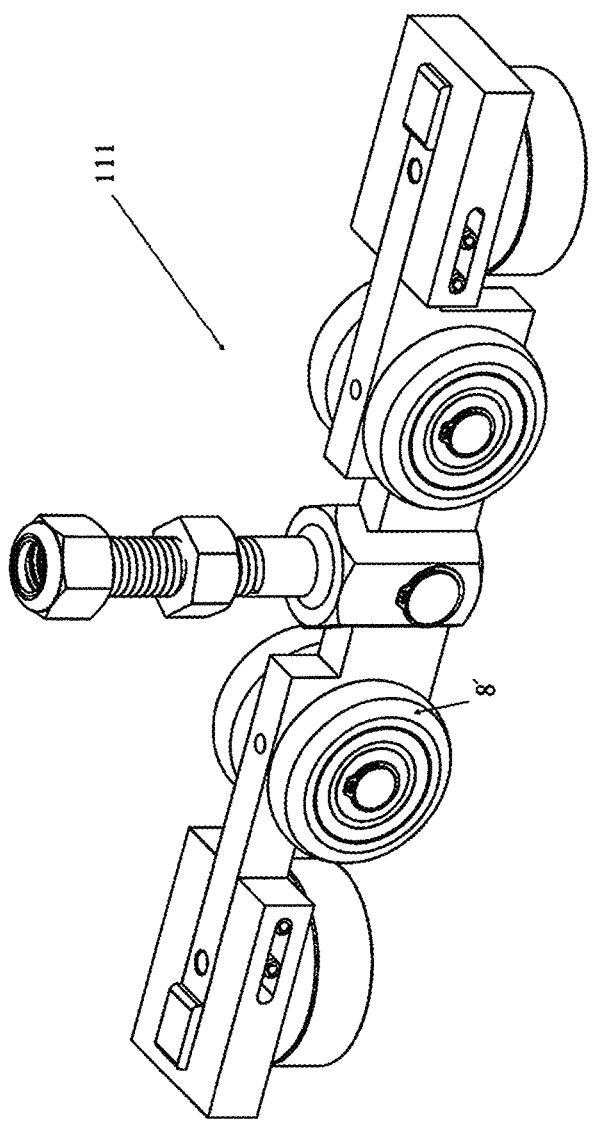
FIG. 20 illustrates a perspective view of an example of a 4-wheel trolley.
Figure 21:
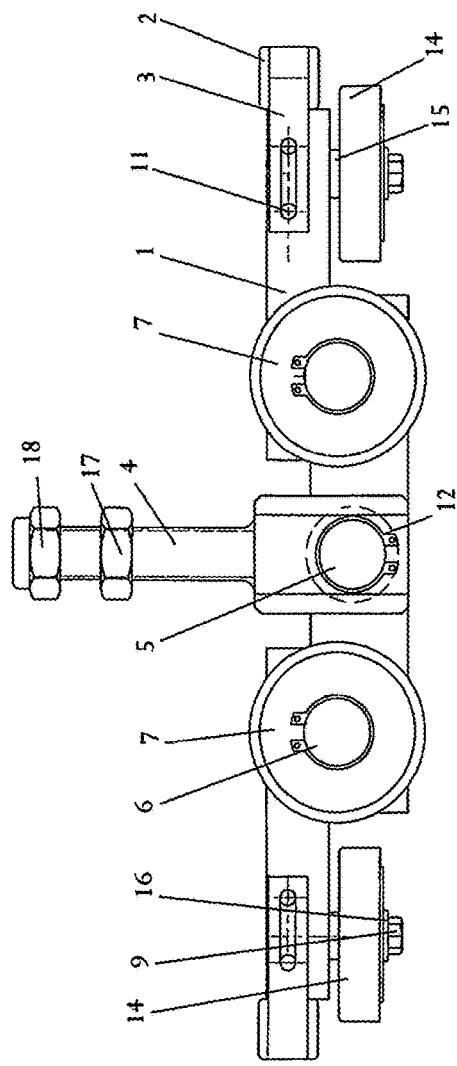
FIG. 21 illustrates a side plan view of another example of a 4-wheel trolley.
Figure 22:
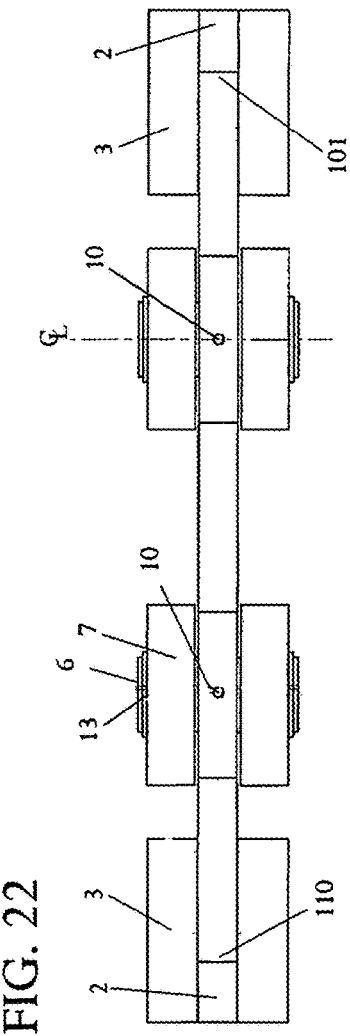
FIG. 22 illustrates a partial top plan view of the example in FIG. 21 omitting the clevis and the guide rollers.

In the example of FIG. 20, a four-wheel trolley 111 is shown. Another example of a four-wheel trolley 111 is illustrated in FIG. 21. In this example, the wheel bearings 7 are used without tires. All of the other label numbers in FIG. 21 identify the same components as illustrated in the eight-wheel example of FIG. 2. As can be best seen in the top plan view of FIG. 22, the trolley 111 comprises pairs of wheel bearings 7 without tires on opposite sides of the frame 1. Alternatively, the example in FIG. 20 includes tires 8' that may be similar to the tires 8 illustrated in FIG. 1 or may have a more planar contact surface, for example.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. A trolley comprising:
a frame comprised of a rigid member, the rigid member having a first end and a second end, the first end extending in a first direction and the second end extending in a second direction, opposite of the first direction; and
a resilient bumper, wherein the resilient bumper comprises a compressible portion and an incompressible portion having a contact surface, and the incompressible portion of the resilient bumper is mounted slidably on the first end of the frame such that the contact surface of the incompressible portion extends outwardly from the first end of the frame in the first direction, and the compressible portion is disposed between the incompressible portion and a portion of the frame, such that, when the contact surface of the incompressible portion impacts an object, the incompressible portion is capable of sliding in the second direction, and the compressible portion resiliently compresses between the incompressible portion and the portion of the frame, absorbing energy of the impact and applying a bias force against movement of the incompressible portion in the second direction, wherein the bumper is coupled to the frame by at least one pin, the at least one pin engaging a slot formed in a portion of the incompressible portion of the bumper.

2. The trolley of claim 1, further comprising at least one wheel, the wheel comprised of a resilient, non-metallic tire, a wheel bearing and an axle, wherein the wheel bearing has an outer radial surface rotatably mounted on a hub, and the hub of the wheel bearing is coupled by the axle at a side of the frame, such that the wheel is disposed between the first end of the frame and the second end of the frame, and the tire engages the outer radial surface of the wheel bearing, such that the tire and outer radial surface of the wheel bearing rotate about the hub together, without slippage of the tire on the wheel bearing.

3. The trolley of claim 2, further comprising a guide roller coupled to the frame.

4. The trolley of claim 3, wherein the guide roller is attached under the bumper, such that the contact surface of the incompressible portion of the bumper extends beyond an outer circumference of the guide roller.

5. The trolley of claim 1, wherein the at least one pin is two pins, and the two pins each extend through respective holes in the frame such that opposite ends of the two pins extend into respective slots formed in portions of the incompressible portion on opposite sides of the frame, and the two pins and respective slots limit travel of the bumper in both the first direction and the second direction.

6. The trolley of claim 5, wherein the portions of the incompressible portion on opposite sides of the frame engage a central portion of the compressible portion of the bumper, retaining the central portion of the compressible portion between the portions of the incompressible portion, and the compressible portion has two legs extending from the central portion of the compressible portion, and the two legs engage a central portion of the incompressible portion, such that the compressible portion is retainably engaged.

7. The trolley of claim 1, wherein the bumper is coupled to the frame by at least one pin, the at least one pin engaging a slot formed in a portion of the incompressible portion of the bumper.

8. The trolley of claim 7, wherein the at least one pin is two pins, and the two pins each extend through respective holes in the frame such that opposite ends of the two pins extend into respective slots formed in portions of the incompressible portion on opposite sides of the frame, and the two pins and respective slots limit travel of the bumper in both the first direction and the second direction.

9. The trolley of claim 8, wherein the portions of the incompressible portion on opposite sides of the frame engage a central portion of the compressible portion of the bumper, retaining the central portion of the compressible portion between the portions of the incompressible portion, and the compressible portion has two legs extending from the central portion of the compressible portion, and the two legs engage a central portion of the incompressible portion, such that the compressible portion is retainably engaged.

10. A trolley and track assembly, comprising:
a track having a channel, the channel comprising a pair of side walls, a pair of contact surfaces and a pair of transition regions, each extending between a respective one of the pair of side walls and a respective one of the contact surfaces and sloping from the respective one of the side walls downwardly and inwardly toward the center of the track to the respective one of the contact surfaces;
a frame comprised of a rigid member, the rigid member having a first end and a second end, the first end extending in a first direction and the second end extending in a second direction, opposite of the first direction; and
a resilient bumper, wherein the resilient bumper comprises a compressible portion and an incompressible portion having a contact surface, and the incompressible portion of the resilient bumper is mounted slidably on the first end of the frame such that the contact surface of the incompressible portion extends outwardly from the first end of the frame in the first direction, and the compressible portion is disposed between the incompressible portion and a portion of the frame, such that, when the contact surface of the incompressible portion impacts an object, the incompressible portion is capable of sliding in the second direction, and the compressible portion resiliently compresses between the incompressible portion and the portion of the frame, absorbing energy of the impact and applying a bias force against movement of the incompressible portion in the second direction; and
a pair of wheels, each of the pair of wheels being comprised of a resilient, non-metallic tire, a wheel bearing and an axle, wherein the wheel bearing has an outer radial surface rotatably mounted on a hub, and the hub of the wheel bearing is coupled by the axle at a side of the frame, such that the wheel is disposed between the first end of the frame and the second end of the frame, and the tire engages the outer radial surface of the wheel bearing, such that the tire and outer radial surface of the wheel bearing rotate about the hub together, without slippage of the tire on the wheel bearing, wherein the pair of wheels are disposed on opposite sides of the frame and the tire of the respective one of the pair of wheels contacts a respective one of the contact surfaces of the channel, and each of the pair of wheels has a curved portion of the tire capable of making contact with a respective one of the pair of transition regions, if the trolley is not centered in the channel, and the curved portion is arranged such that contact between the curved portion and sloping of the transition region recenters the trolley within the channel, when the trolley is not centered in the channel, wherein the bumper is coupled to the frame by at least one pin, the at least one pin engaging a slot formed in a portion of the incompressible portion of the bumper.

11. The trolley of claim 10, wherein the at least one pin is two pins, and the two pins each extend through respective holes in the frame such that opposite ends of the two pins extend into respective slots formed in portions of the incompressible portion on opposite sides of the frame, and the two pins and respective slots limit travel of the bumper in both the first direction and the second direction.

12. The trolley of claim 11, wherein the portions of the incompressible portion on opposite sides of the frame engage a central portion of the compressible portion of the bumper, retaining the central portion of the compressible portion between the portions of the incompressible portion, and the compressible portion has two legs extending from the central portion of the compressible portion, and the two legs engage a central portion of the incompressible portion, such that the compressible portion is retainably engaged.

* * * * *